United States Patent Office 3,062,857
Patented Nov. 6, 1962

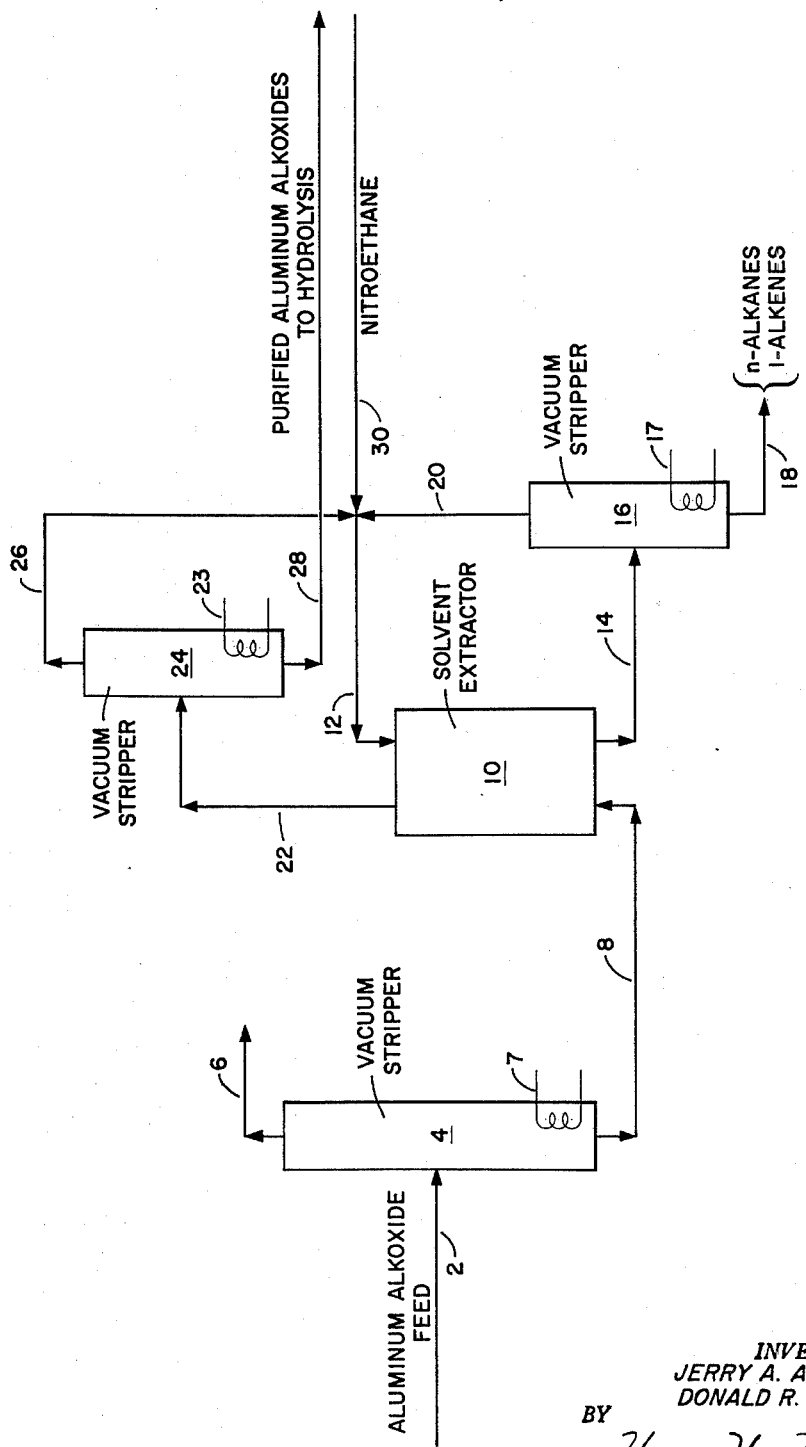

3,062,857
PROCESS FOR THE PURIFYING METAL ALKOXIDES WITH A LOWER NITROALKANE
Jerry A. Acciarri and Donald R. Napier, Ponca City, Okla., assignors to Continental Oil Company, Ponca City, Okla., a corporation of Delaware
Filed Jan. 14, 1960, Ser. No. 2,402
17 Claims. (Cl. 260—448)

This invention relates to a process for the recovery of metal alkoxides from admixture with alkanes and alkenes by extraction with nitroalkanes.

Alkanols can be prepared by the oxidation of metal alkyls such as aluminum trialkyl followed by hydrolysis of the alkoxy product. Oxidation of the aluminum trialkyls provides not only the intermediate alkoxy product but also various impurities including n-alkanes and 1-alkenes. It is desirable that these impurities be removed from the alkoxides, since the subsequent hydrolysis to yield alkanols provides a reaction mixture which is difficultly separated by distillation because of the similarity of the boiling points of the various components, particularly the higher molecular weight components of said reaction mixture.

It is an object of this invention to provide an improved process for the separation of metal alkoxides from impurities comprising alkanes and alkenes.

It is another object of this invention to provide an improved process for the separation of aluminum alkoxides from admixture with impurities comprising hydrocarbon solvent and higher molecular weight alkanes and alkenes having boiling points similar to said alkoxides.

Still another object of this invention is to provide an improved process for the recovery of aluminum alkoxides in which the alkyl groups contain from 2 to about 24 carbon atoms from admixture with impurities comprising n-alkanes and 1-alkenes having from about 12 to about 24 carbon atoms.

Yet another object of this invention is to provide an improved process for the recovery of aluminum alkoxides from the reaction product obtained from the oxidation of aluminum trialkyls.

The invention is realized broadly within the scope of the foregoing objects by subjecting an admixture comprising metal alkoxides, alkanes, and alkenes to extraction with a nitroalkane and recovering metal alkoxide product.

In one aspect of the invention, highly volatile materials including solvent and lower molecular weight alkanes and alkenes are removed from the admixture prior to extraction, preferably by stripping under vacuum.

In another aspect of the invention, nitroalkane is recovered from the extraction products and recycled for reuse in the process.

The process of this invention is broadly applicable to the separation and recovery of metal alkoxides from admixtures comprising alkanes and alkenes. The process finds particular application in the treatment of admixtures of similar boiling points which cannot be economically separated by distillation. The invention finds special use in the separation and recovery of alkoxides prepared from the oxidation of metal alkyls, for example, aluminum trialkyls, as described in U.S. Patent No. 2,892,858 to Karl Zeigler. Briefly, in this process, a simple metal alkyl, such as aluminum triethyl, is grown (reacted) continuously with an olefin, such as ethylene, whereby a complex mixture of metal alkyls is formed having the general formula, for example:

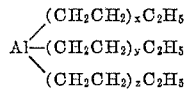

in which $x$, $y$, and $z$ are integers ranging from 0 to 11.

The complex metal alkyls are then oxidized with oxygen (air) to form metal alkoxides. The alkoxides which are formed in this process have a composition following a Poisson distribution and including in the alkyl groups molecules containing usually from 2 to about 24 carbon atoms. The alkyl groups of the alkoxides can be either like or unlike. The alkoxide product obtained, as hereinbefore set forth, contains a wide variety of by-product n-alkanes and 1-alkenes containing carbon atoms comparable in number to the alkyl groups of the alkoxides. In addition, the reaction product contains solvent which may be employed in carrying out the reaction. Desirably the by-product n-alkanes, 1-alkenes and solvent are separated from the oxidation reaction product prior to hydrolysis of the alkoxides to alkanols, since a substantial proportion of these components boils at temperatures which are in close proximity to the boiling points of the alcohols. The solvent and the lower molecular weight alkanes and alkenes, for example, those containing up to 12 to 14 carbon atoms, are readily separable from the metal alkoxides by distillation. However, the higher molecular weight compounds containing from about 14 to about 24 carbon atoms are sufficiently close in boiling points to the alkoxides that their separation by distillation is impractical.

In carrying out the invention in one embodiment for the recovery of aluminum alkoxides from an admixture such as that described, a nitroalkane such as nitroethane is brought in contact with impure alkoxide whereby two fractions are obtained, an extract in which impurities comprising alkanes and alkenes are preferentially absorbed, and a raffinate which is enriched in alkoxides and contains a minor proportion of nitroethane. The raffinate is further treated, for example, by vacuum stripping to separate nitroethane and provide a product enriched in aluminum alkoxides. The reaction conditions employed in the process can vary substantially, depending on the particular components in the mixture to be treated and the specific nitroalkane which is employed in effecting the separation. For example, when separating alkoxides from the alkanes and alkenes with nitroethane, extraction can be effected at relatively low temperatures, for example, at about 40 to about 200° F. When utilizing other nitroalkanes, either higher or lower temperatures are required, depending on the particular extraction agent employed. Thus, nitropropane requires lower temperatures than nitroethane, and extraction of the alkoxides can be effected at higher temperatures with nitromethane. The molecular weight distribution of the alkoxides is also an important factor in establishing the conditions which are employed in the process, both in the separation of the solvent and the more volatile alkanes and alkenes prior to the extraction step and also in the subsequent operations for the recovery of the extraction agent.

Following extraction, the raffinate and extract fractions are preferably processed to recover the nitroalkane which can be reused in the process and to provide alkoxide of increased purity and a product comprising alkanes and alkenes. The latter product can be further processed if desired to obtain additional valuable products. In view of the boiling points of the materials involved in the process, it is desirable that recovery of the nitroalkane be effected under vacuum preferably in the order of about 1 to about 600 millimeters of mercury. The preliminary treatment of the alkoxide reaction product to separate solvent and highly volatile alkanes and alkenes is also by preference carried out under vacuum. Although not usually required, an extraneous stripping gas which is inert in the system, such as nitrogen, can be used if desired.

The extraction agent employed in the process comprises the lower nitroalkanes, preferably nitromethane, nitroethane, and nitropropane. These materials can be used either alone or in combination. The particular extractive agent employed depends on the mixture to be treated. As pointed out previously, the conditions of temperature, pressure, etc., which are provided during extraction depend on the composition of the admixture and also on the particular extraction agent which is used. The quantity of nitroalkane employed in the process usually varies in amount from about 0.2 and about 20 grams per gram of alkoxide-alkene-alkane mixture and preferably between about 1 and about 5 grams per gram.

The metal alkoxides can be prepared from various metals, particularly those contained in groups I, II, and III of the periodic table, for example, sodium, boron, magnesium, aluminum, lithium, and the like; however, by far the preferred metal is aluminum. As stated previously, the alkoxide radicals can contain either like or unlike alkyl groups which can vary widely in the number of carbon atoms contained therein.

The solvents which are employed in the preparation of the metal alkoxides include broadly the conventional hydrocarbon solvents, that is, aromatic, acyclic, and alicyclic hydrocarbons. Specific materials which can be employed include the xylenes, the various commercial solvents, hydrocarbon mixtures such as kerosene light and heavy alkylates, individual hydrocarbons such as isooctane, nonane, undecane, methyl cyclohexane and the like. The only limitation on the solvent is the vapor pressure which in general precludes the use of solvents having less than about 7 to 8 carbon atoms.

The invention can be practiced to recover substantially pure metal alkoxides from a complex mixture. The degree of purity of the product depends of course both on the conditions employed in the process and on the number of stages of separation which are provided. The latter are readily determined by those skilled in the art from a consideration of the selectively values obtained in the multi-stage separations set forth in the specific examples, selectivity being defined as set forth in Table I presented hereinafter. It is contemplated that in a multi-stage separation recycle of products obtained from the various stages can be practiced in a conventional manner and also heat exchange between the various streams can be employed for the conservation and maximum utilization of thermal energy. While in the preferred embodiment, the invention is directed to the treatment of mixtures containing metal alkoxides, n-alkanes and 1-alkenes, it is within the scope of the invention to separate more complex materials such as alkoxides containing branched alkyl groups from branched alkanes and internally unsaturated olefins and various combinations thereof.

In order to more clearly describe the invention and provide a better understanding thereof, reference is had to the accompanying drawing which is a diagrammatic illustration of extraction system suitable for carrying out the invention.

Referring to the drawing, a feed material obtained from the oxidation of aluminum trialkyls, comprising a complex mixture of aluminum alkoxides, n-alkanes, 1-alkenes containing from about 2 to about 24 carbon atoms in kerosene solvent is introduced to a vacuum stripper 4 through conduit 2. In the stripper, heat is provided through reboiler 7 to effect vaporization of the kerosene solvent and the more volatile alkanes and alkenes, whereby materials containing less than about 14 carbon atoms are stripped from the mixture, passing overhead from the stripper through conduit 6. The stripper bottoms which are substantially free from solvent and contain components having hydrocarbon groups varying in carbon content from about 14 to about 24 carbon atoms are passed from the stripper through conduit 8 and introduced to the lower portion of a multi-stage solvent extractor 10. In the extractor, this material is contacted with nitroethane solvent introduced through the conduit 12 whereby countercurrent contact is provided between the solvent and alkoxide containing stream. Solvent extractor 10 can be any conventional apparatus employed for the extraction and separation of liquids, for example, a packed tower, a tray-type tower, etc. An extract stream enriched in alkanes and alkenes and comprising the major portion of the nitroethane solvent is withdrawn from the solvent extractor through conduit 14 and introduced to a second vacuum stripper 16. In this stripper which is heated by reboiler 17, separation is effected between the nitroethane and the n-alkane-1-alkene mixture. Nitroethane, which is recovered overhead from the stripper, is condensed (not shown) and returned to solvent extractor 10 through conduits 20 and 12. A mixture of alkanes and alkenes, now substantially free from solvent, is removed from stripper 16 through conduit 18 for further processing as desired.

A second product stream, which is designated as raffinate is recovered overhead from solvent extractor 10 through conduit 22. This stream which is rich in alkoxides and contains a minor proportion of nitroethane solvent is introduced to third vacuum stripper 24 wherein separation is effected between these materials, the heat required being supplied by reboiler 23. Nitroethane solvent, which is removed overhead from the vacuum stripper, is condensed (not shown) and returned to the solvent extractor through conduits 26 and 12. Purified aluminum alkoxides are removed from the vacuum stripper through conduit 28 and yielded from the system for further processing.

In the foregoing series of operations losses of material, particularly solvent, occur which require the introduction of make-up solvent, this being supplied through conduit 30.

The preceding discussion has been directed to a preferred embodiment of the invention; however it is to be understood that this is not intended in any limiting sense, and other arrangements utilizing the principles set forth herein can be utilized within the skill of the art and are included within the scope of the invention.

The following examples are presented further in illustration of the invention.

EXAMPLE I

Aluminum triethyl, consisting mainly of aluminum-ethyl bonds and a small amount of aluminum-hydride and aluminum-butyl bonds, was combined with 20 percent by weight paraffinic-solvent and grown continuously with ethylene in a tubular growth reactor at 248° F. and 1,500 p.s.i.g. ethylene partial pressure to an average "$m$"* value of 4.0. These aluminum alkyls were then oxidized continuously in a tower at 120° F. countercurrent to a stream of dry air. Approximately 90 percent of the aluminum-carbon bonds were oxidized in this first stage, with the remainder being oxidized batchwise with air at 80° F. The effluent oxidized growth product was then treated with five weight percent isopropanol at 207° F. for two hours to effect the removal of any unoxidized alkyl group still attached to the aluminum. The treated oxidized growth product was then partially purified by distilling the lighter volatile components away from the aluminum alkoxides through a packed tower operating with no reflux at 150° F. and 5 mm. Hg absolute pressure. To 1,004 grams of these aluminum alkoxides were added 2,011 grams of nitroethane. This two-phase mixture was thoroughly shaken at room temperature for 15 minutes. After the phase split occurred, the phases were separated, and the same extraction procedure was repeated four more times using fresh nitroethane each time. After the last extraction, the aluminum alkoxide layer was stripped of dissolved nitroethane by simultaneous application of heat (130° F.) and vacuum (5 mm. Hg absolute pressure).

---

* The product of the growth reaction follows a statistical distribution known as the Poisson Distribution. Mathematically, this may be expressed as follows:

$$(\text{moles})_n \, \alpha f(n) = \frac{e^{-m} m^n}{n!}$$

where:
$(\text{moles})_n$ = number of moles having $n$ additions of ethylene
$n$ = number of additions of ethylene to an Al—C—C group
$m$ = mean number of additions of ethylene These purified aluminum alkoxides were hydrolyzed at 160° F. with twice their weight of 25 weight percent sulfuric acid. The resultant alcohols were water washed four times with equal volumes of hot (140–180° F.) water. The individual fractions were then analyzed by gas-liquid partition chromatography.

EXAMPLE II

Example I was repeated.

EXAMPLE III

The same procedure was followed as in Example I except that a 1:1 weight ratio of nitropropane to aluminum alkoxide was used with four contacting stages.

The results obtained in the examples are presented in the following table:

NITROPARAFFIN EXTRACTIONS OF ALUMINUM ALKOXIDES

| Solvent | Number contacting stages | Solvent feed | Extraction temp., °C. | Fractions from hydrolysis of aluminum alkoxides [1] | Weight percent composition in each fraction | | | | Selectivity [2] for impurity in individual fraction |
|---|---|---|---|---|---|---|---|---|---|
| | | | | | Before extraction | | After extraction | | |
| | | | | | Percent alcohol | Percent Impurity | Percent alcohol | Percent Impurity | |
| Example I | Nitroethane | 5 | 2/1 | 20 | Fraction 14 | 84.0 | 16.0 | 93.0 | 7.0 | 1.2 |
| | | | | | Fraction 16 | 60.0 | 40.0 | 84.5 | 15.5 | 1.3 |
| | | | | | Fraction 18 | 57.3 | 42.7 | 81.9 | 18.1 | 1.3 |
| | | | | | Fraction 20 | 52.5 | 47.5 | 78.3 | 21.7 | 1.3 |
| Example II | do | 5 | 2/1 | 20 | Fraction 16 | 84.2 | 15.8 | 92.5 | 7.5 | 1.2 |
| | | | | | Fraction 18 | 79.6 | 20.4 | 94.0 | 6.0 | 1.3 |
| Example III | 1-nitropropane | 4 | 1/1 | 20 | Fraction 16 | 82.9 | 17.1 | 96.0 | 4.0 | 1.5 |

[1] Fraction 14—That fraction which boils between 300° F. and 311° F. at 10 mm. Hg pressure and contains the 14 carbon atom alcohol as the major alcohol constituent. Fraction 16—That fraction which boils between 331°F. and 371°F. at 10 mm. Hg pressure and contains the 16 carbon atom alcohol as the major alcohol constituent. Fraction 18—That fraction which boils between 371°F. and 410°F. at 10 mm. Hg pressure and contains the 18 carbon atom alcohol as the major alcohol constituent. Fraction 20—That fraction which boils between 410°F. and 450°F. at 10 mm. Hg pressure and contains the 20 carbon atom alcohol as the major alcohol constituent.

[2] Definition of selectivity $(\beta)$: $\frac{\text{Weight percent alcohol in final product}}{\text{Weight percent impurity in final product}} = (\beta)^n \frac{\text{(Weight percent alcohol in initial mixture)}}{\text{(Weight percent impurity in initial mixture)}}$ where n=number contacting stages.

Having thus described the invention by providing specific examples thereof, it is to be understood that no undue limitations or restrictions are to be drawn by reason thereof and that many variations and modifications are within the scope of the invention.

We claim:

1. A method for the recovery of metal alkoxides from admixture with impurities comprising alkanes and alkenes which comprises extracting said alkanes and alkenes from said admixture with a lower nitroalkane and separating said metal alkoxide product from said nitroalkane.

2. The process of claim 1 in which the metal alkoxide is aluminum alkoxide.

3. The process of claim 2 in which the nitroalkane is nitroethane.

4. The process of claim 2 in which the nitroalkane is nitropropane.

5. A method for the recovery of metal alkoxides from admixtures with impurities comprising solvent, alkanes, and alkenes which comprises stripping said admixture to separate therefrom solvent and highly volatile alkanes and alkenes, extracting said alkanes and alkenes from the alkanes and alkenes from the admixture comprising metal alkoxides, alkanes and alkenes of similar boiling points with a lower nitroalkane and separating said alkoxides from said nitroalkanes.

6. The process of claim 5 in which the metal alkoxide is aluminum alkoxide.

7. The process of claim 6 in which the nitroalkane is nitroethane.

8. The process of claim 6 in which the nitroalkane is nitropropane.

9. A method for the recovery of aluminum alkoxides from admixture with impurities comprising hydrocarbon solvent, alkanes and alkenes which comprises stripping said admixture under vacuum to separate therefrom said solvent and highly volatile alkanes and alkenes, contacting the remainder of said admixture comprising alkoxides, alkanes and alkenes of similar boiling points with a lower nitroalkane to provide an extract rich in alkanes and alkenes and a raffinate rich in aluminum alkoxides and separating said aluminum alkoxides from said raffinate.

10. The process of claim 9 in which the nitroalkane is nitroethane.

11. The process of claim 9 in which the nitroalkane is nitropropane.

12. A method for the recovery of aluminum alkoxides from admixture with impurities comprising hydrocarbon solvent, n-alkanes and 1-alkenes which comprises stripping said admixture under vacuum to separate therefrom said solvent and highly volatile n-alkanes and 1-alkenes, contacting the remainder of said mixture comprising alkoxides, n-alkanes, and 1-alkenes of similar boiling points with a lower nitroalkane to provide an extract rich in n-alkanes and 1-alkenes and a raffinate rich in aluminum alkoxides, separating n-alkanes and 1-alkenes from said extract and aluminum alkoxides from said raffinate by stripping under vacuum and recycling nitroalkane for re-use in the process.

13. The process of claim 12 in which the nitroalkane is nitroethane.

14. The process of claim 12 in which the nitroalkane is nitropropane.

15. A method for the recovery of aluminum alkoxides in which the alkyl groups contain from 2 to 24 carbon atoms from admixture with impurities comprising solvent, n-alkanes varying from n-octane to n-tetracosane and 1-alkenes varying from 1-octene to 1-tetracosane which comprises stripping said admixture under vacuum to separate therefrom said solvent and alkanes and alkenes containing less than 12 carbon atoms, contacting the remainder of said admixture comprising alkoxides, n-alkanes, and 1-alkenes of similar boiling points with a lower nitroalkane to provide an extract rich in n-alkanes and 1-alkenes and a raffinate rich in aluminum alkoxides, separating n- alkanes and 1-alkenes from said extract and aluminum alkoxides from said raffinate by stripping under vacuum and recycling nitroalkane for reuse in the process.

16. The process of claim 15 in which the nitroalkane is nitroethane.

17. The process of claim 15 in which the nitroalkane is nitropropane.

References Cited in the file of this patent

UNITED STATES PATENTS 2,863,895    Kirshenbaum et al. _____ Dec. 9, 1958

OTHER REFERENCES

Ericsson: Industrial and Engineering Chemistry, vol. 35, No. 10 (October 1943), pp. 1028 and 1029.

Brown et al.: Unit Operations (1950), pages 297–298.